W. A. SHEPHARD.
LIQUID MIXING AND FILLING APPARATUS.
APPLICATION FILED JULY 28, 1913.

1,101,574.

Patented June 30, 1914.

UNITED STATES PATENT OFFICE.

WILLIAM A. SHEPHARD, OF WAUKESHA, WISCONSIN.

LIQUID MIXING AND FILLING APPARATUS.

1,101,574.  Specification of Letters Patent.  Patented June 30, 1914.

Application filed July 28, 1913. Serial No. 781,477.

*To all whom it may concern:*

Be it known that I, WILLIAM A. SHEPHARD, a citizen of the United States, and resident of Waukesha, in the county of Waukesha and State of Wisconsin, have invented certain new and useful Improvements in Liquid Mixing and Filling Apparatus; and I do hereby declare that the following is a full, clear, and exact description thereof.

My invention refers to bottling apparatus and is especially applicable to that type of bottling device described in a patent issued to me for improvements in milk cooling and bottling apparatus, No. 1048597, dated December 31, 1912.

The object of my present invention is to provide a simple, economical and effective mixer in connection with the nozzles of a distributing pipe for supplying a series of bottles, whereby milk from two or more cows is thoroughly mixed as it is discharged into the bottles, thus rendering it possible to provide each bottle so filled with milk of uniform richness, it being apparent that, under ordinary conditions, the milk from a group of cows varies in butter fat and should this milk be successively discharged into original packages it would result in an uneven grade of milk being distributed to the trade, due to the fact that said milk was not previously thoroughly mixed. It will also be understood that while I have mentioned the fact that the mixer is particularly applicable to bottling apparatus for milk, that said mixer may be utilized with equal efficiency in mixing other liquids.

With the above objects in view the invention consists in certain details of construction and combination of parts, as hereinafter set forth with reference to the accompanying drawings and subsequently claimed.

Figure 1:
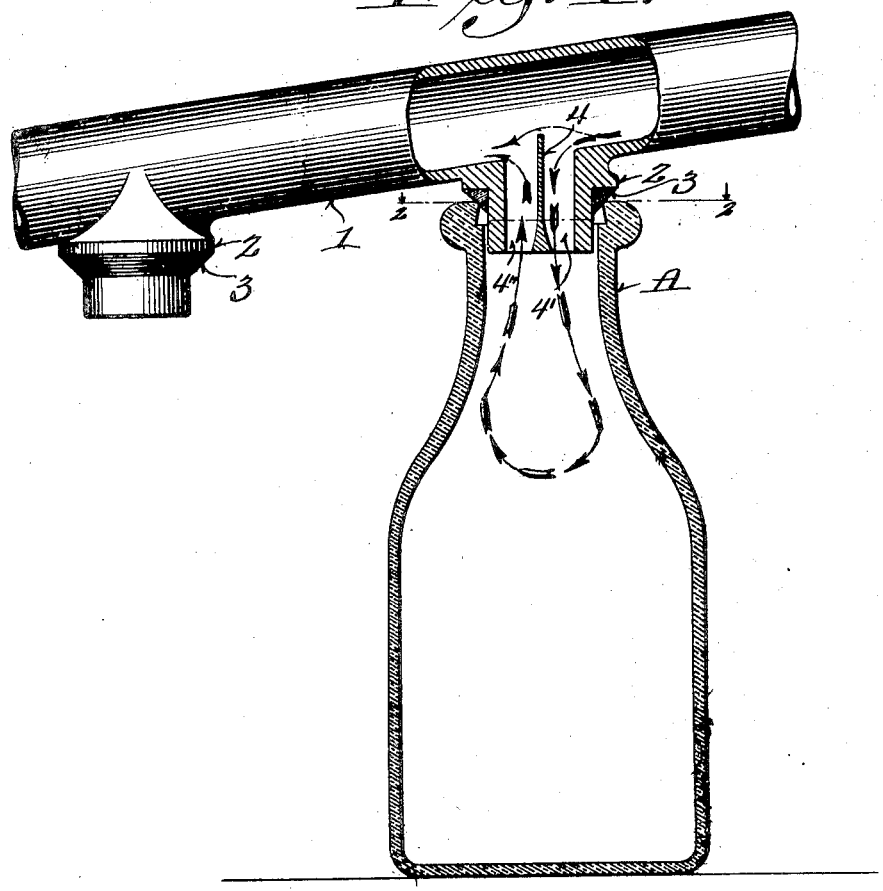
Figure 2:
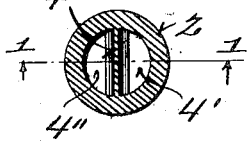

In the drawings Figure 1 represents a side elevation partly in section of a liquid-distributing pipe provided with discharge nozzles embodying the features of my invention, one of the nozzles being shown applied to the mouth of a milk bottle, and Fig. 2, a detailed cross-section of one of the nozzles, the section being indicated by line 2—2 of Fig. 1.

Referring by characters to the drawings, 1 represents a distributing pipe provided with a series of discharge nozzles 2, there being only two of such nozzles illustrated. Each nozzle is adapted to fit into and form a closure for the mouth of a container A, in the form of a bottle, and, in order to effect a seal, the nozzle is fitted with a tapered face gasket 3, which gasket is seated against a shoulder of the nozzle, the protruding end of said nozzle being arranged to extend a predetermined distance into the neck of said bottle as shown. The bore of each nozzle has cast or otherwise fitted therein a longitudinally disposed central partition wall 4, which wall divides the nozzle into a feed passage 4′ and an overflow passage 4″. The upper edge of the partition wall 4 projects above the plane of the lower face of the discharge pipe flow channel, the said upper portion of the wall constituting a baffle-plate, whereby a predetermined quantity of the milk is caused to flow into the bottle in its travel through the pipe, while a certain quantity of said liquid will flow over the baffle-plate toward the next nozzle, as indicated by the arrows.

By the above arrangement it is apparent that as the milk or other liquid flows in the direction indicated, that portion of the stream below the edge of the baffle-plate will be caused to drop into the bottle and when said bottle is filled, the continuous flow through the pipe channel will set up a circulation down through the feed compartment of the nozzle and up through the overflow compartment, at which point the milk exhausting from the bottle will meet the main flow within the supply pipe, which main flow travels over the baffle-plate edge. Thus a portion of the main flow of liquid from the supply pipe is directed circuitously through the first bottle by the mixing device contained in the nozzle and only a certain percentage of the initial flow will remain in said bottle, which is added to and mixed and is more or less continually displaced as the feed is maintained, whereby a thorough mixing of the fluid will result. The contents of the first bottle will thus approximately equal in richness the contents of the last bottle filled, due to the fact that an eddying current is maintained in each bottle to effect a mixture of fluids of different densities. Attention is also called to the fact that, as shown, the division wall 4 adjacent to the discharge mouth of the nozzle may, in some instances, be flared in opposite directions, whereby the flow of liquid is deflected outwardly to cause a more perfect circulation through the bottle.

I claim:—

1. A mixing and filling apparatus for milk or analogous liquids comprising an inclined distributing pipe, a series of comparatively short nozzles in communication with the channel of said pipe and adapted to extend into the necks only of vessels to be filled, each of said nozzles being divided into a feed and overflow passage of equal length, the said passages being separated by a baffle plate having its upper edge extending above the lower face of the channel of said pipe.

2. A mixing and filling apparatus for milk or analogous liquids comprising an inclined distributing pipe therefor, a series of comparatively short nozzles in communication with the channel of the pipe and adapted to extend into the necks only of vessels to be filled, each of said nozzles being divided into an unobstructed feed and an unobstructed overflow passage of equal length and area, the said passages being separated by a baffle plate having its upper edge extending above the lower face of the channel of said pipe.

In testimony that I claim the foregoing I have hereunto set my hand at Milwaukee in the county of Milwaukee and State of Wisconsin in the presence of two witnesses.

WILLIAM A. SHEPHARD.

Witnesses:
CASANAVE YOUNG,
M. E. DOWNEY.